United States Patent
Sivan et al.

(10) Patent No.: US 9,787,590 B2
(45) Date of Patent: Oct. 10, 2017

(54) TRANSPORT-LEVEL BONDING

(71) Applicant: Mellanox Technologies Ltd., Yokneam (IL)

(72) Inventors: Gal Sivan, Kibutz Ramot Menashe (IL); Saeed Mahameed, Um Alfahem (IL); Vladimir Sokolovsky, Yokneam Ilit (IL); Dotan Barak, Ein HaEmek (IL); Liran Liss, Atzmon (IL); Oren Kladnitsky, Yopkneam Ilit (IL)

(73) Assignee: Mellanox Technologies, Ltd., Yokneam (IL)

( * ) Notice: Subject to any disclaimer, the term of this patent is extended or adjusted under 35 U.S.C. 154(b) by 231 days.

(21) Appl. No.: 14/666,342

(22) Filed: Mar. 24, 2015

(65) Prior Publication Data

US 2015/0280972 A1    Oct. 1, 2015

Related U.S. Application Data

(60) Provisional application No. 61/969,845, filed on Mar. 25, 2014.

(51) Int. Cl.
| | |
|---|---|
| *H04L 12/28* | (2006.01) |
| *H04L 12/803* | (2013.01) |
| *H04L 12/24* | (2006.01) |
| *H04L 12/703* | (2013.01) |
| *H04L 12/721* | (2013.01) |

(52) U.S. Cl.
CPC ........ *H04L 47/125* (2013.01); *H04L 41/0668* (2013.01); *H04L 45/28* (2013.01); *H04L 45/38* (2013.01)

(58) Field of Classification Search
CPC ....................................................... H04L 45/28

USPC ......................................................... 370/241
See application file for complete search history.

(56) References Cited

U.S. PATENT DOCUMENTS

| | | | |
|---|---|---|---|
| 6,721,806 B2 * | 4/2004 | Boyd ................. | G06F 11/2005 714/E11.078 |
| 7,095,750 B2 | 8/2006 | Craddock et al. | |
| 7,555,002 B2 | 6/2009 | Arndt et al. | |
| 8,627,136 B2 | 1/2014 | Shankar et al. | |
| 8,830,870 B2 | 9/2014 | Cardona et al. | |

(Continued)

OTHER PUBLICATIONS

IEEE Standard 802.1AX™-2014, "IEEE Standard for Local and metropolitan area networks—Link Aggregation", 344 pages, Dec. 10, 2014.

(Continued)

*Primary Examiner* — Farah Faroul
(74) *Attorney, Agent, or Firm* — D. Kligler IP Service Ltd.

(57) ABSTRACT

A network node includes one or more network adapters and a bonding driver. The one or more network adapters are configured to communicate respective data flows over a communication network by applying a transport layer protocol that saves communication state information in a state of a respective network adapter. The bonding driver is configured to exchange traffic including the data flows of an application program that is executed in the network node, to communicate the data flows of the traffic via one or more physical links of the one or more network adapters, and, in response to a physical-transport failure, to switch a given data flow to a different physical link or a different network path, transparently to the application program.

43 Claims, 3 Drawing Sheets

(56) References Cited

U.S. PATENT DOCUMENTS

| | | | |
|---|---|---|---|
| 8,856,340 B2 | 10/2014 | Cardona et al. | |
| 2009/0222558 A1* | 9/2009 | Xu | G06F 9/485 709/224 |
| 2010/0195489 A1* | 8/2010 | Zhou | H04L 12/433 370/216 |
| 2013/0086298 A1 | 4/2013 | Alanis et al. | |
| 2014/0032889 A1* | 1/2014 | Koenen | G06F 9/4416 713/2 |
| 2015/0244569 A1* | 8/2015 | Puimedion | H04L 41/0803 709/220 |
| 2016/0050145 A1* | 2/2016 | Tsirkin | H04L 45/745 718/105 |
| 2016/0248620 A1* | 8/2016 | Itkin | H04L 41/04 |

OTHER PUBLICATIONS

Supplement to InfiniBand™, Architecture Specification, vol. 1, Release 1.2.1, annex A17: RoCEv2, 23 pages, Sep. 2, 2014.

Recio et al., "A Remote Direct Memory Access Protocol Specification", Network Working Group, Request for Comments 5040, 57 pages, Oct. 2007.

InfiniBand TM Architecture, Specification vol. 1, Release 1.2.1, 1727 pages, Nov. 2007.

Huang et al., "Nomad: Migrating OS-bypass Networks in Virtual Machines", Proceedings of the 3rd international conference on Virtual execution environments, pp. 158-168, Jun. 13-15, 2007.

Liss., "RDMA Bonding", Open Fabrics Alliance, 10th International Developer Workshop, Mellanox Technologies, 19 pages, Mar. 30-Apr. 2, 2014.

* cited by examiner

TRANSPORT-LEVEL BONDING

CROSS-REFERENCE TO RELATED APPLICATIONS

This application claims the benefit of U.S. Provisional Patent Application 61/969,845, filed Mar. 25, 2014, whose disclosure is incorporated herein by reference.

FIELD OF THE INVENTION

The present invention relates generally to network communication, and particularly to methods and systems for transport-level bonding of data flows.

BACKGROUND OF THE INVENTION

Compute nodes are typically equipped with a network adapter for accessing a communication network. The network adapter may communicate multiple communication links that belong to a single logical link. For example, IEEE standard entitled "802.1AX-2014—IEEE Standard for Local and metropolitan area networks—Link Aggregation," Dec. 24, 2014, which is incorporated herein by reference, specifies MAC-independent link aggregation capability and provides general information relevant to specific MAC types. Link aggregation allows parallel full-duplex point-to-point links to be used as if they were a single link and also supports the use of multiple links as a resilient load sharing interconnect between multiple nodes in two separately administered networks.

As another example, U.S. Pat. No. 8,856,340, whose disclosure is incorporated herein by reference, describes mechanisms for providing a network adapter and functionality for performing link aggregation within a network adapter. With these mechanisms, a network adapter includes a plurality of physical network ports for coupling to one or more switches of a data network. A link aggregation module within the network adapter is coupled to the plurality of the physical network ports. The link aggregation module comprises logic for aggregating links associated with the plurality of the physical network ports into a single virtual link.

Some network adapters virtualize physical queues of the network adapters. For example, U.S. Pat. No. 7,095,750, whose disclosure is incorporated herein by reference, describes an apparatus and a method for virtualizing a queue pair space to minimize time-wait impacts. Virtual queue pairs are allocated from a virtual queue pair pool of a node to connections between the node and other nodes. The connection is established between a physical queue pair of the node and physical queue pairs of other nodes. From the viewpoint of the other nodes, they are communicating with the present node using the virtual queue pair and not the physical queue pair for the present node. By using the virtual queue pairs, the same physical queue pair may accommodate multiple connections with other nodes simultaneously. Moreover, when a connection is torn down, the virtual queue pair is placed in a time-wait state rather than the physical queue pair. As a result, the physical queue pair may continue to function while the virtual queue pair is in the time-wait state.

A Network adapter supporting multiple physical links may provide high availability communication, for example, by redirecting the traffic of a failing link to an alternative link. For example, U.S. Pat. No. 6,721,806, whose disclosure is incorporated herein by reference, describes a method, computer program product and a distributed data processing system for supporting a RDMA enabled NIC (RNIC) with switchover and switchback capabilities. When a planned or unplanned outage occurs on a primary RNIC, all outstanding connections are switched over to an alternate RNIC, and the alternate RNIC continues communication processing. Additionally, connections that were switched over can also be switched back.

U.S. Pat. No. 8,627,136, whose disclosure is incorporated herein by reference, describes a novel RDMA connection failover technique that minimizes disruption to upper subsystem modules (executed on a computer node), which create requests for data transfer. A new failover virtual layer performs failover of an RDMA connection in error so that the upper subsystem that created a request does not have knowledge of an error (which is recoverable in software and hardware), or of a failure on the RDMA connection due to the error. Since the upper subsystem does not have knowledge of a failure on the RDMA connection or of a performed failover of the RDMA connection, the upper subsystem continues providing requests to the failover virtual layer without interruption, thereby minimizing downtime of the data transfer activity.

SUMMARY OF THE INVENTION

An embodiment of the present invention that is described herein provides a network node including one or more network adapters and a bonding driver. The one or more network adapters are configured to communicate respective data flows over a communication network by applying a transport layer protocol that saves communication state information in a state of a respective network adapter. The bonding driver is configured to exchange traffic including the data flows of an application program that is executed in the network node, to communicate the data flows of the traffic via one or more physical links of the one or more network adapters, and, in response to a physical-transport failure, to switch a given data flow to a different physical link or a different network path, transparently to the application program.

In some embodiments, the transport layer protocol includes a Remote Direct Memory Access (RDMA) protocol. In an embodiment, the bonding driver is configured to manage a virtual state that the application program uses for interfacing with states of the network adapters. In a disclosed embodiment, the states of the network adapters include physical state elements, the virtual state includes virtual state elements, and the bonding driver is configured to associate the virtual state elements with the physical state elements so that at least one virtual state element corresponds to one or more physical state elements. In another embodiment, the bonding driver is configured to identify a data flow in which data transfers have been completed by polling one or more of the physical state elements associated with the virtual state element of the data flow. In an example embodiment, the bonding driver is configured to switch a given data flow from one of the network adapters to another of the network adapters based on a switching criterion.

In some embodiments, the network adapters are configured to communicate the data flows with a peer network node via respective physical links of the network adapters, and the bonding driver is configured to switch a given data flow from a first physical link to a different second physical link using an out of band protocol. In an embodiment, the bonding driver is configured to switch the given data flow in response to a failure event occurring on the first physical link. In another embodiment, the bonding driver is configured to switch the given data flow to resolve a connectivity problem in the network.

In yet another embodiment, the bonding driver is configured to resume the given data flow by establishing a connection with the peer network node over the second physical link. In an example embodiment, the bonding driver is configured to resume the given data flow by exchanging failure state information obtained at a time of failure with a peer bonding driver of the peer network node during the establishment of a new physical connection.

The failure state information may include a sequence number of a packet that was sent via the first physical link prior to the failure event and has arrived successfully at the peer network node. In another embodiment, the failure state information includes an outcome of an atomic memory operation that was executed at the peer network node prior to the failure event. In yet another embodiment, the failure state information includes resources for RDMA-READ operations that were handled by a responder of the peer network node prior to the failure event. In still another embodiment, the failure state information includes a responder state of the peer network node prior to the failure event, including at least one of: current virtual address, R_Key, and a number of bytes committed so far.

In some embodiments, the physical links include respective first and second physical objects, and the bonding driver is configured to switch the given data flow by replacing an association between a virtual object serving the given data flow from the first physical object to the second physical object. In an embodiment, the bonding driver is configured to switch the given data flow as part of migrating a Virtual Machine (VM) communicating the given data flow to another network node.

In another embodiment, the bonding driver is configured to switch the given data flow when performing load balancing. In yet another embodiment, the bonding driver is configured to switch the given data flow to a physical link that provides a higher bandwidth path to the peer network node. In still another embodiment, the bonding driver is configured to switch the given data flow to apply a high-availability policy.

There is additionally provided, in accordance with an embodiment of the present invention, a method for communication including communicating via one or more network adapters respective data flows over a communication network by applying a transport layer protocol that saves communication state information in a state of a respective network adapter. Traffic including the data flows of an application program that is executed in the network node is exchanged using a bonding driver. The data flows of the traffic are communicated using the bonding driver via one or more physical links of the one or more network adapters. In response to a physical-transport failure, a given data flow is switched to a different physical link or a different network path, transparently to the application program.

There is further provided, in accordance with an embodiment of the present invention, a computer software product. The product includes a tangible non-transitory computer-readable medium in which program instructions are stored, which instructions, when read by a processor of a network node that communicates via one or more network adapters respective data flows over a communication network by applying a transport layer protocol that saves communication state information in a state of a respective network adapter, cause the processor to run a bonding driver on the network node, to exchange using the bonding driver traffic including the data flows of an application program that is executed in the network node, to communicate the data flows of the traffic using the bonding driver via one or more physical links of the one or more network adapters, and, in response to a physical-transport failure, to switch a given data flow to a different physical link or a different network path, transparently to the application program.

The present invention will be more fully understood from the following detailed description of the embodiments thereof, taken together with the drawings in which:

DETAILED DESCRIPTION OF EMBODIMENTS

Overview

Figure 1:
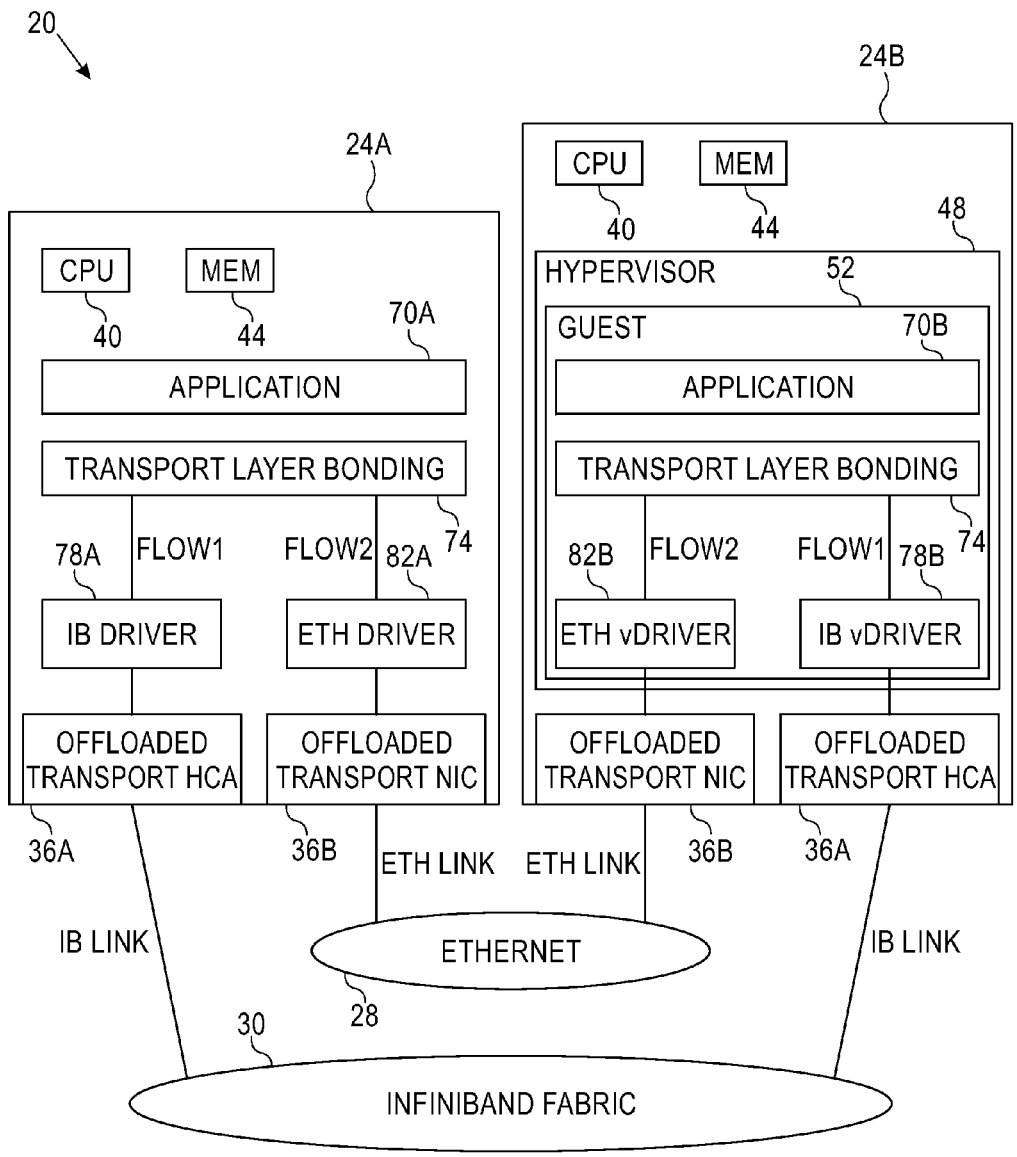
FIG. 1 is a block diagram that schematically illustrates a computing system, in accordance with an embodiment that is described herein.

Embodiments that are described herein provide methods and systems for transport-level bonding of multiple data flows. In some embodiments, a network node comprises multiple network adapters for communicating over a network. Each network adapter communicates one or more respective data flows, and in particular offloads the node of transport-layer protocol functions relating to the flows. As part of the transport-layer protocol handling, each network adapter saves the protocol states of its respective flows. The network node also runs a bonding driver that bonds the data flows handled by the network adapters. The bonding driver interfaces with an application program that runs in the network node. The application program communicates solely with the bonding driver for posting IO requests, and is unaware of the physical resources and the data flows generated on their behalf making-up the bonded traffic via the network adapters.

In the context of the present disclosure and in the claims a transport layer protocol refers to a stateful communication protocol that is used for communicating transport-level data flows. The transport layer protocol typically manages separate transport state information per transport-level data flow. Transport layer protocols include, for example, the Transmission Control Protocol (TCP), the User Datagram Protocol (UDP) and the Remote Direct Memory Access (RDMA) protocol.

When the transport layer protocol is implemented within a network interface controller (NIC), the NIC is referred to as being stateful. For ease of exposition, in the description that follows we assume that each NIC represents a single link to the network. This, however, is not mandatory, and similar concepts apply to NICs having multiple network links, such as, for example, in InfiniBand Host Channel Adapters (HCAs).

The operation of transparently multiplexing multiple transport-level data flows initiated on a single logical stateful NIC over multiple physical NICs is referred to herein as "transport-level bonding". Additionally, the aggregated data flows are collectively referred to herein as a "bond". Transport-level bonding is carried out, for example, by a module that is referred to herein as a "transport-level bonding driver" or simply "bonding driver", for brevity. When the underlying transport layer protocol comprises the RDMA protocol, the transport-level bonding is also referred to herein as "RDMA bonding" and the transport-level bond is referred to herein as a "RDMA bond."

As noted above, transport layer communication involves saving transport state information. In the disclosed embodiments, the transport-level bonding driver manages transport resources that are created over the statful NICs that constitute the bond. This enables the bonding driver, for example, to seamlessly switch a given transport session of the bond among different physical links, based on a suitable switching criterion, as will be described below.

In some embodiments, the network adapters manage transport state information in a physical state that comprises multiple physical objects. For example, in RDMA the physical state comprises a Queue Pair (QP), per a physical link, in which Work Requests (WRs) specifying data transfers are posted. The RDMA physical state additionally comprises a Memory Region (MR) and a Protection Domain (PD) that control access privileges to the memory of the network node.

In some embodiments, the bonding driver serves as a communication interface for an application program. The bonding driver creates virtual objects that implement, in view of the application program, transport-level communication. The bonding driver associates the virtual objects with state physical objects of the network adapters. For example, an RDMA bonding driver creates a virtual QP (vQP) for a data flow, and associates the vQP with one or more physical QPs in the network adapters. The bonding driver also creates virtual MRs (vMRs) and PDs (vPDs) as appropriate. In an embodiment, the bonding driver holds a mapping between the virtual and physical objects. Virtualizing the physical states provides flexible usage of networking resources in the system. More specifically, the virtualization allows the bonding driver to do, transparently to the application program: 1) delay the creation of physical resources until they are actually needed; 2) select an appropriate physical device; 3) change the mapping between a given virtual resource and different physical resources dynamically.

In some embodiments, the bonding driver associates a single virtual object with multiple physical objects of different physical NICs. For example, an RDMA bonding driver may associate a single virtual completion queue (vCQ) with multiple physical completion queues (CQs) that each reports completion of WRs posted to a respective physical QP associated with the vCQ.

In some embodiments, the bonding driver assigns to a given data flow different physical links at different times, transparently to the application program. This feature can be used, for example, for load-balancing among the physical links of the bond and for managing the traffic flow through the networks. To change the physical link used by a given data flow, the bonding driver replaces the physical objects associates the virtual objects of the given data flow. The physical links used before and after the switching may belong to different network adapters, possibly of different types.

In some embodiments, upon detecting that a physical link serving a data flow of the bond has failed, the bonding driver switches the data flow to another physical link with no involvement of the application program.

In some embodiments, to resume the data flow, the bonding drivers on both sides of the failing connection exchange state information using an out of band protocol. The out of band protocol may be implemented using a dedicated channel between the peers, such as a TCP connection. Alternatively, the protocol may utilize existing connection management channels associated with each transport connection, as common, for example, in InfiniBand and RoCE. Hereafter, the term "out of band protocol" shall refer to any of these or other suitable implementations.

Each of the bonding drivers first retrieves, from its local network adapter, state information of the transport at the time of failure. The bonding drivers then re-establish a connection on other respective physical NICs and exchange the retrieved state information with one another. The bonding drivers then use the exchanged state information to resume the data flow from the exact point of failure. The bonding drivers may re-establish the connection on network adapters whose type is different from the type of the network adapters on which the failure occurred.

The ability to switch among multiple physical resources, transparently to the application, is also beneficial for live Virtual Machine (VM) migration. The physical resources are detached before applying the migration and other physical resources are attached after the VM migration.

In some embodiments, the data flow may be suspended on one set of physical resources and resumed on a different set of physical resources without requiring an out of band protocol. This is possible, for example, when the traffic is reattempted using the same physical resource names (e.g., QPs and memory keys) and network addresses (e.g., IP and MAC addresses), and the transition is fast enough such that the peer HW transport does not timeout and transition into error. In this case, no recovery information exchange is required to resume transport operation. This ability is useful for efficient and rapid dynamic load balancing and transparent migration. In the transparent migration case, if the virtual transport resource names are identical to the names of the underlying physical resources, then transparent migration may be supported even if the communicating peers do not use a bonding driver.

System Description

FIG. 1 is a block diagram that schematically illustrates a computing system 20, in accordance with an embodiment that is described herein. In the example of FIG. 1, system 20 comprises compute nodes 24A and 24B, which communicate with one another over two communication networks, i.e., an Ethernet network 28 and an InfiniBand network 30. Compute nodes 24 are also referred to herein as network nodes. Network nodes 24 comprise a Host Channel Adapter (HCA) 36A for interfacing the InfiniBand network, and a Network Interface Controller (NIC) 36B for interfacing the Ethernet network. HCA 36A and NIC 36B are also collectively referred to herein as network adapters 36.

Although in system 20 networks 28 and 30 respectively comprise an Ethernet network and an InfiniBand network, in alternative embodiments, networks and 30 may comprise any suitable type of network having any suitable infrastructure and related protocols. The network infrastructure may comprise, for example, several interconnected subnets, each comprising switches, routers and/or any other suitable network element. Each of networks 28 and 30 may comprise a local or a wide area network (WAN/LAN), a wireless network, or a combination of such networks. Additionally, the network may be a packet network such as IP, e.g., with TCP as the transport protocol, InfiniBand, or Ethernet network, delivering information at any suitable data rate.

Network node 24 comprises a Central Processing Unit (CPU) 40 and a memory module 44. CPU 40 is also referred to as a host processor, or simply host, for brevity. Network adapters 36 implement a transport layer communication protocol internally, thus offloading this task from CPU 40 or any other processing unit of network node 24. Example transport layer protocols include the TCP, UDP and RDMA protocols. In the example of FIG. 1, network nodes 24 communicate with one another via HCAs 36A and Infini-Band network 30, as well as via NICs 36B and Ethernet network 28.

As noted above, transport layer protocols handle communication by saving transport state information. The transport state information may comprise, for example, queued data pending for transmission. Alternatively or additionally, the transport state information may refer to data that was sent but not yet acknowledged by the receiving peer. In the RDMA protocol, transport state information refers, for example, to queues of work requests and completion notifications, as well as the wire-protocol state such as sent and expected Packet Sequence Numbers (PSNs).

Some transport layer protocols, such as the TCP, or the RDMA protocol operating in the Reliable Connection (RC) mode, support acknowledgment notifications from the receiving peer to the sender. This feedback enables these protocols to serve reliable communications by retransmitting unacknowledged data. Other transport layer protocols such as the UDP, or RDMA protocol operating in the Unreliable Datagram (UD) mode, provide unreliable communications.

In the example of FIG. 1, network node 24B comprises a hypervisor 48, which provides processing and memory resources, i.e., of CPU 40 and memory 44, for one or more guest Virtual Machines (VMs) 52 (the figure depicts only one VM 52). CPU 40 of network node 24A and VM 52 of network node 24B execute respective application programs 70A and 70B. Application programs 70 may carry out computing tasks (or other tasks) in compute system 20.

In some embodiments, to carry out a desired task, application program 70 accesses memory 44 in another network node via communication network 28 or 30. In an embodiment, network adapters 36 implement the transport layer protocol (e.g., the RDMA protocol) internally in hardware. A network adapter that implements the RDMA protocol is also referred to herein as a RDMA-enabled device. Implementing the transport layer protocol within the network adapters, provides application programs 70 direct and low-latency access to memory 44 in remote network nodes with no involvement of CPUs 40.

Application program 70A interfaces network adapters 36A and 36B in network node 24A via a transport-level bonding driver 74, and one of an InfiniBand driver 78A and an Ethernet driver 82A. Similarly, application program 70B interfaces network adapters 36A and 36B in network node 24B via transport-level bonding driver 74 and one of virtual IndiniBand driver 78B and virtual Ethernet driver 82B. In some embodiments, IB driver 78 implements the RDMA over Converged Ethernet (RoCE) protocol. The RoCE protocol is specified, for example, in "Supplement to Infini-Band™, Architecture Specification, volume 1, release 1.2.1, annex A17: RoCEv2, Sep. 2, 2014, which is incorporated herein by reference.

In other embodiments, IB driver 78 implements the iWARP protocol, which that implements RDMA over Internet Protocol (IP) networks. The iWARP protocol is specified, for example, by the Network Working Group of the Internet Engineering Task Force (IETF®), in "A Remote Direct Memory Access Protocol Specification," Request for Comments (RFC) 5040, October, 2007, which is incorporated herein by reference.

In some embodiments, network adapters 36 may comprise virtual switches, for example, in implementations in which multiple VMs such as VM52 are serviced by network adapters 36.

In the example of FIG. 1, network nodes 24 communicate with one another a bond comprising transport-level data flows that are denoted FLOW1 and FLOW2. FLOW1 is communicated via InfiniBand network 30 and FLOW2 via Ethernet network 28. As will be described below, when the physical link that carries a data flow fails, bonding driver 74 can re-establish the connection using another physical link of the network node, negotiate the transport state upon failure and resume the data flow from the point of failure on the established connection. The disclosed techniques support seamless recovery of a data flow even when the respective physical link fails as a result of an abrupt disconnection from the network.

The system configuration in FIG. 1 is given by way of example, and other suitable system configurations can also be used. For example, although in system 20 one of the network nodes runs the application program on a virtual machine and the other on a non-virtual machine, in alternative embodiments, application program 70 in any of network nodes 24 may run on a virtual or a physical machine.

Typically, network node 24 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

The different elements of network node 24 may be implemented using software, or using suitable hardware such as an Application-Specific Integrated Circuit (ASIC) or Field-Programmable Gate Array (FPGA). In some embodiments, elements of network node 24 can be implemented using a combination of hardware and software elements. For example, although not mandatory, network adapters 36 (including the transport layer protocol implementation) typically support high data rates and are therefore implemented in hardware. In other embodiments, network adapters 36 are implemented entirely in software. This allows, for example, to implement the RoCE protocol over para-virtual NICs in virtual environments.

HCA 36A and NIC 36B may comprise separate modules connecting to the host using a suitable bus, or may be integrated with the network node hardware, for example, on the mother board of the node, and may be interconnected by internal buses.

Software Architecture for Implementing Transport-Level Bonding

Figure 2:
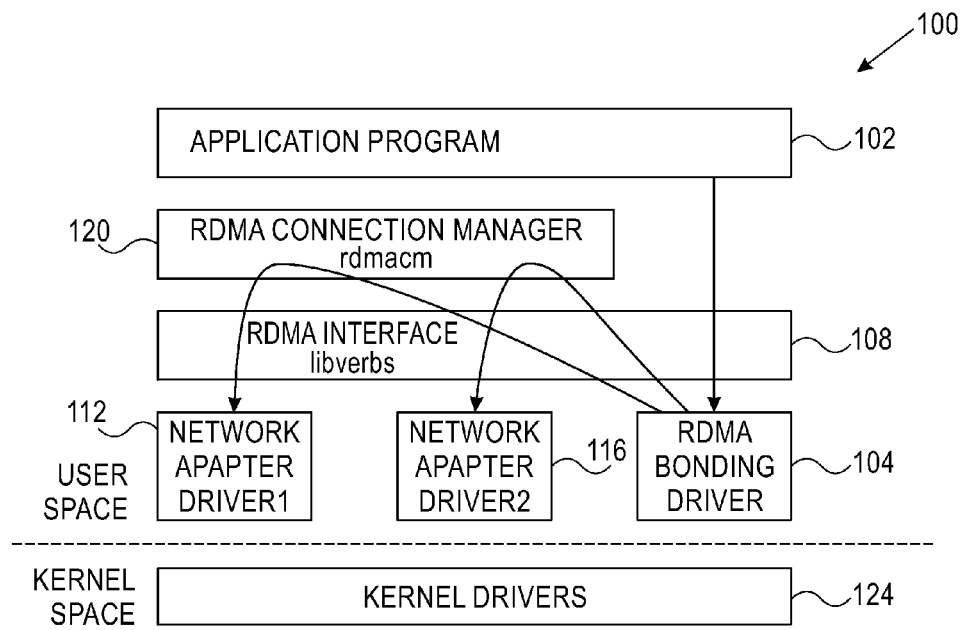
FIG. 2 is a diagram that schematically illustrates software architecture for implementing transport-level bonding, in accordance with an embodiment that is described herein.

FIG. 2 is a diagram that schematically illustrates software architecture 100 for implementing transport-level bonding, in accordance with an embodiment that is described herein. Although the example of FIG. 2 refers to RDMA bonding, similar implementations apply to any other suitable transport-level bonding. Software architecture 100 can be used, for example, in implementing transport-level bonding in network nodes 24 of FIG. 1 above.

In software architecture 100, an application program 102 exchanges data with a RDMA bonding driver 104 via a RDMA interface 108. Application program 102 and RDMA bonding driver 104 may be similar to application programs and bonding drivers 74 of FIG. 1 above. The functionality of RDMA interface 108, which is also referred to herein as a RDMA core layer, is based on RDMA verbs specified, for example, by the InfiniBand Trade Association (IBTA)" in "InfiniBand™ Architecture Specification," volume 1, release 1.3, Mar. 3, 2015, whose disclosure is incorporated herein by reference. The RDMA verbs provide an abstract description of the functionality of an underlying RDMA-enabled device. Application programs, such as application program 102, may use RDMA verbs to create and manage objects related to implementing the RDMA protocol such as certain queue objects as will be explained below.

In some embodiments, RDMA interface 108 is implemented as a library, as provided, for example, by the OpenFabrics Aliance host software stack.

Drivers 112 and 116 (denoted DRIVER1 and DRIVER2, respectively) interface between the software parts of software architecture 100 and the underlying RDMA-enabled network adapters (e.g., HCAs and NICs). Drivers 112 and 116 typically comprise vendor-specific device drivers.

During initialization RDMA bonding driver 104 registers with RDMA core layer 108 as a conventional RDMA device. When registered, the RDMA bonding driver appears to application program 102 as a RDMA-enabled network adapter. In some embodiments, following registration, the application program creates (virtual) RDMA transport objects in RDMA bonding driver 104. As will be described in detail below, RDMA bonding driver 104 creates physical RDMA objects in the underlying network adapters and associates between the physical and virtual objects. Example virtual-physical associations are described, for example, with reference to FIG. 3 below.

Software architecture 100 comprises a RDMA Connection Manager (CM) 120, which initiates RDMA connections based on IP addresses. In an embodiment, RDMA bonding driver 104 creates the physical objects in the network adapters using RDMA interface 108 or RDMA CM 120.

Application program 102 performs RDMA data transfers by interfacing RDMA bonding driver 104 via RDMA interface 108 or RDMA CM 120. As will be described below, RDMA bonding driver 104 accepts from the application program RDMA-related operations referring to the virtual objects, and applies the operations to the physical objects in the network adapters.

In some embodiments, RDMA bonding driver 104 is identified using an IP address identifier, which the bonding driver uses for establishing connections.

In some embodiments, RDMA bonding driver 104 is not assigned an IP address. In such embodiments, the IP addresses of network adapters 112 and 116 are used instead, and application connections that are resolved to these IP addresses are redirected by RDMA Connection Manager 120 to the RDMA bonding driver.

Software architecture 100 describes a user space driver stack implementation. Alternatively, kernel drivers 124 residing in the kernel space area, may implement similar software architecture. In this case, kernel services may benefit from RDMA bonding similarly to user applications.

The software architecture in FIG. 2 is given by way of example, and in alternative embodiments other suitable software architectures can also be used, for example, partitioning the RDMA bonding functionality between the user-space and the kernel-space differently.

Virtualizing Physical Objects of the Transport Protocol

Figure 3:
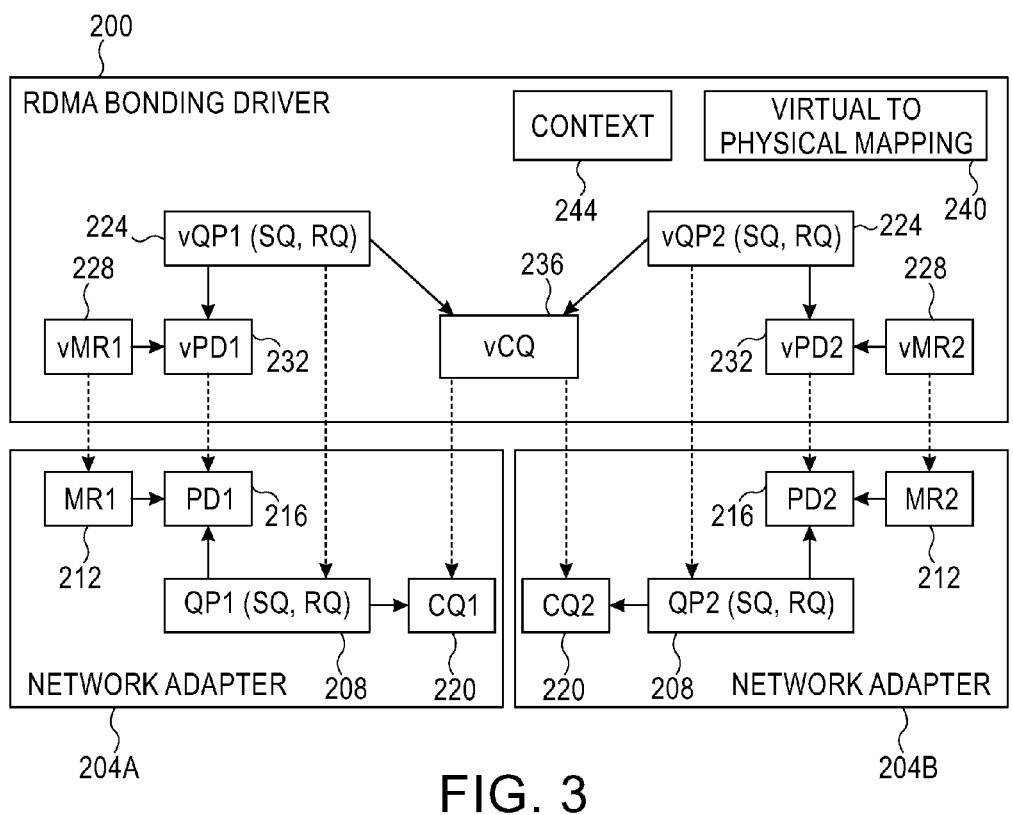
FIG. 3 is a block diagram that schematically illustrates virtualization of physical objects of RDMA-enabled network adapters, in accordance with an embodiment that is described herein.

FIG. 3 is a block diagram that schematically illustrates virtualization of physical objects of RDMA-enabled network adapters, in accordance with an embodiment that is described herein. In FIG. 3, we assume that a RDMA bonding driver 200 and network adapters 204 reside in a network node such as network nodes 24 of FIG. 1 above. RDMA bonding driver 200 may be used, for example, for implementing bonding driver 74 of FIG. 1 or RDMA bonding driver 104 of FIG. 2 above.

In the present example bonding driver 200 bonds data flows that are carried via network adapters 204A and 204B, respectively. To establish a connection between network adapters 204 and peer network adapters (not shown), bonding driver 200 creates RDMA physical objects in network adapters 204. In FIG. 3, the RDMA objects comprise a Queue Pair (QP) 208 in which the user (e.g., an application program via a suitable interface) posts Work Requests (WR), a Memory Region (MR) 212 and a Protection Domain (PD) 216.

QP 208 comprises a Send Queue (SQ) and a Receive Queue (RQ) for posting Send Requests (SRs) and Receive Requests (RRs), respectively. MR 212 comprises a contiguous set of memory buffers with associated access permissions. Typically, when MR 212 is created, local and remote keys (L_Key and R_key) are created and associated with the MR for local and remote initiated transport operations, respectively. PD 216 controls the ability of the network adapter to access the host system memory (e.g., memory 44 in network node 24). PD 216 associates, for example, between QPs and MRs.

A Completion Queue (CQ) 220 comprises a queue of CQ Entries (CQEs). In an embodiment, when a WR that was posted in QP 208 is completed, network adapter 204 adds a completion notification CQE to CQ 220. The RDMA bonding driver may, for example, poll CQ 220 to retrieve information regarding WRs in respective QP 208 that have been completed.

As noted above, RDMA bonding driver 200 creates virtual objects for the application program and associates the virtual objects with physical objects in the network adapters. In the example of FIG. 3, the application program has created RDMA virtual objects vQP1 and vQP2 224, vMR1 and VMR2 228 and vPD1 and vPD2 232. The dashed arrows in FIG. 3 depict associations between the virtual and physical RDMA objects. When the application program posts a WR to vQP1 or vQP2 the bonding driver respectively posts the WR to QP1 or QP2 in the relevant network adapter.

In the example of FIG. 3, the application program has created a single virtual completion queue vCQ 236, which the RDMA bonding driver associates with both physical completion queues CQ1 and CQ2. In an embodiment, when the application program polls vCQ 236, RDMA bonding driver 200 polls both CQ1 and CQ2, as will be described below.

RDMA bonding driver 200 comprises a mapping 240, which holds the associations between the virtual and physical objects. RDMA bonding driver 200 uses mapping 240, for example, for directing WRs posted to the virtual queues to the relevant physical queues. In some embodiments, RDMA bonding driver 200 creates a physical object in response to the creation of the respective virtual object even before the physical object is actually needed. In other embodiments, RDMA bonding driver 200 creates the physical object on demand, e.g., only when the application program posts a first WR to the respective vQP. In an embodiment, after creating a physical object, RDMA bonding driver 200 associates between physical object and the respective virtual object in mapping 240.

In an embodiment, each vQP is associated with a single active physical QP at any point in time. This leverages the HW ordering guarantees provided by the physical QP, and relieves the RDMA bonding driver from implementing this task in software.

RDMA bonding driver 200 further comprises a context module 244, which stores state information regarding the RDMA bond. Context 244 holds, for example, information regarding the connections used by the bond in both the local and peer network nodes, such as IP address of the bonding drivers, QP numbers (QPN) that identify the peer virtual and physical QPs that communicate with vQPs 224, and peer virtual and physical remote keys.

RDMA bonding driver 200 may associate a given virtual object with different respective physical objects in different times. For example, the RDMA bonding driver may initially associate QP1 with vQP1 and at a later time associate QP2 with vQP1.

In an embodiment, during the lifetime of a data flow, RDMA bonding driver 200 may replace the physical link allocated for the flow, with an alternative physical link on the same or another network adapter within the network node. In some embodiments, instead of replacing the physical link, the RDMA bonding driver replaces the network path, for example, by connecting to a different IP address of the peer host.

The RDMA bonding driver may replace the physical link using any suitable policy or switching criterion. For example, in accordance with an active-backup policy, the RDMA bond comprises a single active RDMA physical link, and the bonding driver selects an alternative physical link upon link failure. In some embodiments, RDMA the bonding driver holds a predefined transitions configuration that defined supported transitions and priorities among the physical links.

In some embodiments, the RDMA bonding driver selects the physical links of the data flows in accordance with a static load-balancing policy. For example, the links may be selected in round-robin order, using a hash calculation, or based on the load at the time when the flow is established.

In other embodiments, the RDMA bonding driver applies dynamic load-balancing, for example, based on the current traffic load in each physical link and, for example, on dynamic parameters of the data flow, such as temporal data rate, and flow/congestion control status. In this case, active connections are migrated accordingly.

The bonding driver and network adapter configurations of FIG. 3 are given by way of example, and in alternative embodiments other bonding driver and network adapter configurations can also be used. For example, although in FIG. 3 the RDMA bond comprises two data flows (communicated via two network adapters), in other embodiments, the bond may comprise any other suitable number of data flows.

In FIG. 3 a virtual completion queue vCQ 236 is associated with physical completion queues CQ1 and CQ2. In other embodiments, any virtual object may be associated with one or more physical objects that each belongs to a different physical network adapters. This includes RDMA objects such as PD, MR, Shared Receive Queue (SRQ) and Address Handle (HA). For example, when a given PD is used with multiple physical adapters, the single vPD created by the application program is associated with a respective physical PD for each of the physical adapters.

Figure 4:
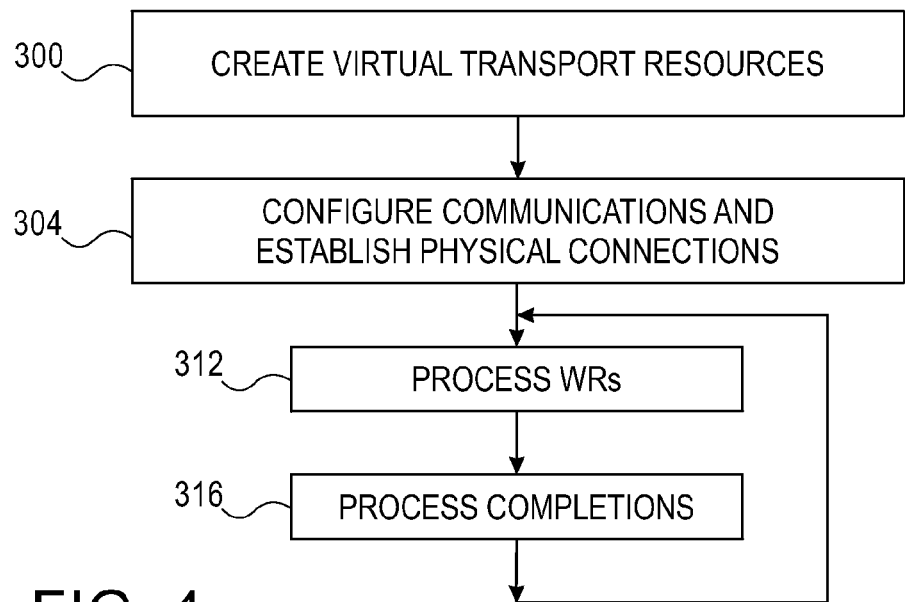
FIG. 4 is a flow chart that schematically illustrates a method for transport-level bonding, in accordance with an embodiment of the present invention.

FIG. 4 is a flow chart that schematically illustrates a method for transport-level bonding, in accordance with an embodiment of the present invention. In the description that follows we assume that the method is executed by a transport-level bonding driver such as, for example, RDMA bonding driver 200 of FIG. 3 or RDMA bonding driver 104 within software application 100 of FIG. 2. We additionally assume that an application program communicates one or more transport-level data flows via the bonding driver.

The method begins at a transport creation step 300 by the bonding driver receiving from the application program instructions for creating (virtual) transport objects, and creates these objects accordingly. At a communication establishment step 304, the bonding driver configures the virtual objects in accordance with the desired communication flows. The bonding driver then selects an available physical link in one of the underlying network adapters according to a predefined or configurable policy. The bonding driver creates corresponding physical objects for the data flow and associates between the virtual and the physical objects in mapping 240.

As noted above, the bonding driver may create physical objects up front or on demand. For example, when the bonding driver creates a vMR, the bonding driver can also create a corresponding physical MR for each of the physical adapters that might be used by the data flows of the bond. Alternatively, the bonding driver may create a physical MR for a given physical adapter only when a first WR is posted to the relevant vQP. Similarly, the physical connections may be initiated only when the first WR is posted to the send queue of a vQP or when handling an incoming peer connection request, instead of at configuration time.

At a WR processing step 312, the bonding driver processes a WR that was posted by the application program in one of the vPQs. To post the WR to the corresponding physical QP the bonding driver retrieves the identifier of the QP from mapping 240. For each vMR that is referenced by memory buffers specified by the posted WR, the boding driver finds, in mapping 240, a physical MR to which the mapped QP belongs.

When the WR specifies a RDMA operation, the bonding driver additionally resolves the virtual R_key of the peer vQP to a physical R_Key of the associated peer QP using the out of band communication protocol. The bonding driver caches the peer physical R_key for later use.

At a completion processing step 316, the bonding driver polls the physical CQs associated with a vCQ. In an embodiment, a vCQ is associated with a single physical CQ and the bonding driver polls for one or more of the CQEs in this CQ that were not yet processed. In another embodiment, the vCQ is associated with multiple physical CQs and the bonding driver processes the vCQ by polling all the associated CQs. In some embodiments, the bonding driver polls the associated CQs sequentially. Alternatively, the bonding driver can poll the CQs in any other suitable order. The bonding driver considers a given vCQ empty when all of the CQs associated with the given vCQ are found empty.

Typically, established physical transport connections will alternately follow steps 312 and 316. Upon failure, link migration, or address change, the processing will temporarily be stalled until step 304 is re-executed for the new physical resources. Different transport resources are handled independently. Therefore, the aforementioned flow in FIG. 4 may occur in parallel for different connections and transition between the steps independently.

Recovering a Failing Data Flow in a Transport-Level Bond

A physical link that belongs to a transport-level bond may fail, for example, when disconnected from the communication network while traffic is being transferred. In the disclosed embodiments, when a failure occurs, the bonding driver resumes affected connections on another physical link of the network node, starting from the point of failure, transparently to the application program.

At the time of failure, the vQP associated with the data flow using the failing link may contain WRs that the bonding driver has not yet started to process. Additionally, a WR that was processed prior to the failure may not have been completed when the failure occurred. Further additionally, a given WR may have been completed but the bonding driver did not receive the respective completion notification from the peer because of the link failure. In the disclosed embodiments the local and peer bonding drivers exchange transport state information using an out of band protocol to recover the data flow from the exact point of failure.

Figure 5:
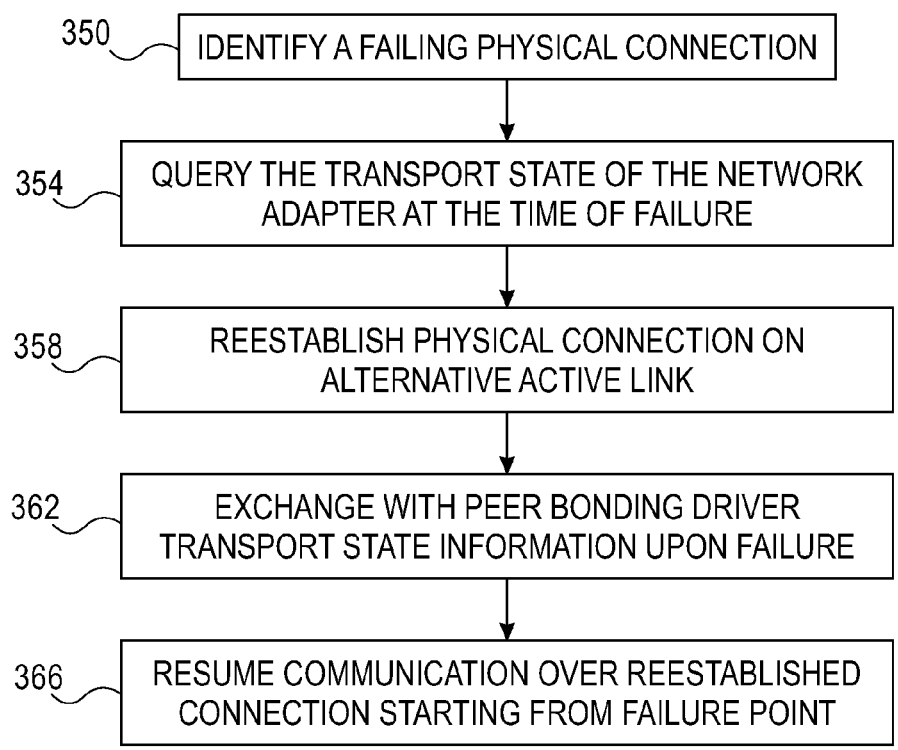
FIG. 5 is a flow chart that schematically illustrates a method for recovering a failing data flow of a transport-level bond, in accordance with an embodiment of the present invention.

FIG. 5 is a flow chart that schematically illustrates a method for recovering a failing data flow of a transport-level bond, in accordance with an embodiment of the present invention. In the method of FIG. 5 we assume that the transport data flow served by the failing link is delivered over a reliable connection such as, for example, a TCP connection or a RDMA Reliable Connection (RC). In alternative embodiments, similar methods may be applied to unreliable connections. For example, connectivity may be checked periodically using the out of band protocol, and recovery may be achieved by remapping the unreliable vQP to another physical QP associated with a different physical link.

The method begins with the bonding driver identifying that a data flow of the bond has failed, at a failure identification step 350. At a state query step 354, the bonding driver queries transport state information of the physical QP of the failing flow at the time of failure. In some embodiments, the transport state information comprises sequence numbers of the latest packets that were successfully sent and received via the physical link. Alternatively or additionally, the transport state information may comprise any other suitable state information that may be useful for resuming the data flow from the point of failure. When using the RDMA protocol, this state information includes the last sent and expected PSNs, active RDMA-READ and ATOMIC responder resources, and the current responder state including: current virtual address, R_Key, and the number of bytes committed so far. Note that upon failure, the peer bonding driver on the other side of the connection also retrieves transport state information of its physical link.

At a connection re-establishment step 358, the bonding driver (as well as the peer bonding driver) selects an alternative physical link for resuming the connection.

At a state exchanging step 362, the bonding driver exchanges with the peer bonding driver, using the out of band protocol, the transport state information that was queried at step 354 above. At a resuming step 366, the bonding driver uses the state information of the peer network adapter to establish the connection and to resume the data flow from the exact failing point (e.g., at packet granularity). Using the state information of the peer physical link, the bonding driver identifies WRs that were successfully completed but not acknowledged because of the failure, and generates vCQEs in the vCQ, accordingly.

In some embodiments, the underlying transport layer protocol supports atomic operations such as compare-and-swap and fetch-and-add. For example, a requester may instruct a responder to apply an atomic operation on a given virtual memory address of the responder. The responder executes the atomic operation and returns the memory value prior to execution to the requestor. Note that if the responder executed the atomic operation and sent the response value shortly before the link failure, the requestor may never receive this response, because of the failure. The requestor, however, should not resend an unacknowledged atomic operation to the responder because the relevant memory value at the responder may have changed if the atomic operation was already executed by the responder.

In some embodiments, upon link failure the bonding driver on each side of the connection retrieves from its network adapter the ATOMIC responder resources that comprise the outcome of recently executed atomic operations. The peer bonding drivers exchange this state information with one another while reestablishing the connection. The bonding driver uses the atomic operation outcomes reported by the peer bonding driver to generate completion notifications for completed but yet unacknowledged atomic operations.

In some embodiments, upon link failure the bonding driver on each side of the connection retrieves from its network adapter the RDMA-READ responder resources that comprise the PSN ranges of recently executed RDMA-READ operations. The peer bonding drivers exchange this state information with one another while reestablishing the connection, and configure the underlying physical QP accordingly. The physical QP uses this state information, for example, to handle duplicate RDMA-READ requests that may occur after the connection is reestablished.

Live Migration of a Virtual Machine

In compute node clusters, a VM running on a given compute node may need to be migrated to another compute node in the cluster. The process of VM migration is performed, for example, for balancing the workload among the compute nodes or for maintenance purposes. In live migration a VM is migrated transparently to the user while the compute nodes remain operational. During live migration the state of the VM is migrated, and the migrated VM resumes execution starting from the migrated VM state.

In some embodiments, a VM accesses a communication network via a network adapter that implements transport layer communication internally. In such embodiments, the live migration should include migrating the transport state of the communication protocol.

Renewing connectivity after migration may be viewed as a special case of the method described in FIG. 5 above, wherein the failing link belongs to the original host (prior to migration) and the re-established link belongs to the target host (after migration). In this case, the bonding driver may be disconnected from the underlying physical devices for a short time period, during which the bonding driver avoids reporting the failure to the application program. To distinguish between this scenario and a permanent failure, in which the application should be notified, a sufficiently large timeout value may be used.

The methods described in FIGS. 4 and 5 are given by way of example and in alternative embodiments other suitable methods can also be used. For example, although the methods of FIGS. 4 and 5 are described separately, in an embodiment the methods can be combined and executed jointly. Although the method of FIG. 5 refers mainly to switching a physical link in response to link failure, in alternative embodiments, the bonding driver may switch a given flow to another physical link in accordance with any other suitable switching criterion, such as, for example, to resolve connectivity problems in the network.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network node, comprising:
one or more network adapters, which are configured to communicate respective data flows over a communication network by applying a transport layer protocol that saves communication state information in a state of a respective network adapter; and
a bonding driver, which is configured to exchange traffic comprising the data flows of an application program that is executed in the network node, to communicate the data flows of the traffic via one or more physical links of the one or more network adapters, and, in response to a physical-transport failure, to exchange state information with a remote bonding driver, and to resume the data flow over a different physical link or a different network path, transparently to the application program, starting from a point determined from the exchanged state information.

2. The network node according to claim 1, wherein transport layer protocol comprises a Remote Direct Memory Access (RDMA) protocol.

3. The network node according to claim 1, wherein the bonding driver is configured to manage a virtual state that the application program uses for interfacing with states of the network adapters.

4. The network node according to claim 3, wherein the states of the network adapters comprise physical state elements, wherein the virtual state comprises virtual state elements, and wherein the bonding driver is configured to associate the virtual state elements with the physical state elements so that at least one virtual state element corresponds to one or more physical state elements.

5. The network node according to claim 1, wherein the bonding driver is configured to switch a given data flow from one of the network adapters to another of the network adapters based on a switching criterion.

6. The network node according to claim 1, wherein the bonding driver is configured, in response to the physical-transport failure, to identify requests of the application program that were completed but not acknowledged because of the failure and to generate respective completion queue entries for the identified requests.

7. The network node according to claim 1, wherein the bonding driver is configured to resume the data flow starting from a packet which was being transmitted when the failure occurred.

8. A network node, comprising:
one or more network adapters, which are configured to communicate respective data flows over a communication network by applying a transport layer protocol that saves communication state information in a state of a respective network adapter; and
a bonding driver, which is configured to exchange traffic comprising the data flows of an application programs that is executed in the network node, to communicate the data flows of the traffic via one or more physical links of the one or more network adapters, and, in response to a physical-transport failure, to switch a given data flow to a different physical link or a different network path, transparently to the application program,
wherein the bonding driver is configured to manage a virtual state that the application program uses for interfacing with states of the network adapters,
wherein the bonding driver is configured to identify a data flow in which data transfers have been completed by polling one or more of the physical state elements associated with the virtual state element of the data flow.

9. A network node, comprising:
one or more network adapters, which are configured to communicate respective data flows over a communication network by applying a transport layer protocol that saves communication state information in a state of a respective network adapter; and
a bonding driver, which is configured to exchange traffic comprising the data flows of an application programs that is executed in the network node, to communicate the data flows of the traffic via one or more physical links of the one or more network adapters, and, in response to a physical-transport failure, to switch a given data flow to a different physical link or a different network path, transparently to the application program,
wherein the network adapters are configured to communicate the data flows with a peer network node via respective physical links of the network adapters, and wherein the bonding driver is configured to switch a given data flow from a first physical link to a different second physical link using an out of band protocol.

10. The network node according to claim 9, wherein the bonding driver is configured to switch the given data flow in response to a failure event occurring on the first physical link.

11. The network node according to claim 9, wherein the bonding driver is configured to switch the given data flow to resolve a connectivity problem in the network.

12. The network node according to claim 9, wherein the bonding driver is configured to resume the given data flow by establishing a connection with the peer network node over the second physical link.

13. The network node according to claim 12, wherein the bonding driver is configured to resume the given data flow by exchanging failure state information obtained at a time of failure with a peer bonding driver of the peer network node during the establishment of a new physical connection.

14. The network node according to claim 13, wherein the failure state information comprises a sequence number of a packet that was sent via the first physical link prior to the failure event and has arrived successfully at the peer network node.

15. The network node according to claim 13, wherein the failure state information comprises an outcome of an atomic memory operation that was executed at the peer network node prior to the failure event.

16. The network node according to claim 13, wherein the failure state information comprises resources for RDMA-READ operations that were handled by a responder of the peer network node prior to the failure event.

17. The network node according to claim 13, wherein the failure state information comprises a responder state of the peer network node prior to the failure event, including at least one of: current virtual address, R_Key, and a number of bytes committed so far.

18. The network node according to claim 9, wherein the physical links comprise respective first and second physical objects, and wherein the bonding driver is configured to switch the given data flow by replacing an association between a virtual object serving the given data flow from the first physical object to the second physical object.

19. The network node according to claim 9, wherein the bonding driver is configured to switch the given data flow as part of migrating a Virtual Machine (VM) communicating the given data flow to another network node.

20. The network node according to claim 9, wherein the bonding driver is configured to switch the given data flow when performing load balancing.

21. The network node according to claim 9, wherein the bonding driver is configured to switch the given data flow to a physical link that provides a higher bandwidth path to the peer network node.

22. The network node according to claim 9, wherein the bonding driver is configured to switch the given data flow to apply a high-availability policy.

23. A method for communication, comprising:
  communicating via one or more network adapters respective data flows over a communication network by applying a transport layer protocol that saves communication state information in a state of a respective network adapter;
  exchanging using a bonding driver traffic comprising the data flows of an application program that is executed in the network node;
  using the bonding driver, communicating the data flows of the traffic via one or more physical links of the one or more network adapters; and
  in response to a physical-transport failure, exchanging state information with a remote bonding driver, and resuming the data flow over a different physical link or a different network path, transparently to the application program, starting from a point determined from the exchanged state information.

24. The method according to claim 23, wherein the transport layer protocol comprises a Remote Direct Memory Access (RDMA) protocol.

25. The method according to claim 23, wherein communicating the data flows comprises managing a virtual state that the application program uses for interfacing with states of the network adapters.

26. The method according to claim 25, wherein the states of the network adapters comprise physical state elements, wherein the virtual state comprises virtual state elements, and wherein communicating the data flows comprises associating the virtual state elements with the physical state elements so that at least one virtual state element corresponds to one or more physical state elements.

27. The method according to claim 23, wherein communicating the data flows comprises switching a given data flow from one of the network adapters to another of the network adapters based on a switching criterion.

28. A method for communication comprising:
  communicating via one or more network adapters respective data flows over a communication network by applying a transport layer protocol that saves communication state information in a state of a respective network adapter;
  exchanging using a bonding driver traffic comprising the data flows of an application program that is executed in the network node;
  using the bonding driver, communicating the data flows of the traffic via one or more physical links of the one or more network adapters; and
  in response to a physical-transport failure, switching a given data flow to a different physical link or a different network path, transparently to the application program,
  wherein communicating the data flows comprises managing a virtual state that the application program uses for interfacing with states of the network adapters, and
  wherein communicating the data flows comprises identifying a data flow in which data transfers have been completed by polling one or more of the physical state elements associated with the virtual state element of the data flow.

29. A method for communication comprising:
  communicating via one or more network adapters respective data flows over a communication network by applying a transport layer protocol that saves communication state information in a state of a respective network adapter;
  exchanging using a bonding driver traffic comprising the data flows of an application program that is executed in the network node;
  using the bonding driver, communicating the data flows of the traffic via one or more physical links of the one or more network adapters; and
  in response to a physical-transport failure, switching a given data flow to a different physical link or a different network path, transparently to the application program,
  wherein communicating the data flows comprises communicating the data flows with a peer network node via respective physical links of the network adapters, and switching a given data flow from a first physical link to a different second physical link using an out of band protocol.

30. The method according to claim 29, wherein switching the given data flow comprises switching the given data flow in response to a failure event occurring on the first physical link.

31. The method according to claim 29, wherein the switching the given data flow comprises switching the given data flow to resolve a connectivity problem in the network.

32. The method according to claim 29, wherein switching the given data flow comprises resuming the given data flow by establishing a connection with the peer network node over the second physical link.

33. The method according to claim 32, wherein resuming the given data flow comprises exchanging failure state information obtained at a time of failure with a peer bonding driver of the peer network node during the establishment of a new physical connection.

34. The method according to claim 33, wherein the failure state information comprises a sequence number of a packet that was sent via the first physical link prior to the failure event and has arrived successfully at the peer network node.

35. The method according to claim 33, wherein the failure state information comprises an outcome of an atomic memory operation that was executed at the peer network node prior to the failure event.

36. The method according to claim 33, wherein the failure state information comprises resources for RDMA-READ operations that were handled by a responder of the peer network node prior to the failure event.

37. The method according to claim 33, wherein the failure state information comprises a responder state of the peer network node prior to the failure event, including at least one of: current virtual address, R_Key, and a number of bytes committed so far.

38. The method according to claim 29, wherein the physical links comprise respective first and second physical objects, and wherein switching the given data flow comprises replacing an association between a virtual object serving the given data flow from the first physical object to the second physical object.

39. The method according to claim 29, wherein switching the given data flow comprises switching the given data flow as part of migrating a Virtual Machine (VM) communicating the given data flow to another network node.

40. The method according to claim 29, wherein switching the given data flow comprises switching the given data flow when performing load balancing.

41. The method according to claim 29, wherein switching the given data flow comprises switching the data flow to a physical link that provides a higher bandwidth path to the peer network node.

42. The method according to claim 29, wherein switching the given data flow comprises switching the data flow to apply a high-availability policy.

43. A computer software product, the product comprising a tangible non-transitory computer-readable medium in which program instructions are stored, which instructions, when read by a processor of a network node that communicates via one or more network adapters respective data flows over a communication network by applying a transport layer protocol that saves communication state information in a state of a respective network adapter, cause the processor to run a bonding driver on the network node, to exchange using the bonding driver traffic comprising the data flows of an application program that is executed in the network node, to communicate the data flows of the traffic using the bonding driver via one or more physical links of the one or more network adapters, and, in response to a physical-transport failure, to exchange state information with a remote bonding driver, and to resume the data flow over a different physical link or a different network path, transparently to the application program, starting from a point determined from the exchanged state information.

\* \* \* \* \*